(12) United States Patent
Heslop et al.

(10) Patent No.: US 7,992,340 B1
(45) Date of Patent: Aug. 9, 2011

(54) FISHING APPARATUS

(76) Inventors: William Heslop, Lodi, CA (US); Greg Rosato, Acampo, CA (US)

( * ) Notice: Subject to any disclaimer, the term of this patent is extended or adjusted under 35 U.S.C. 154(b) by 558 days.

(21) Appl. No.: 12/151,879

(22) Filed: May 9, 2008

(51) Int. Cl.
*A01K 97/12* (2006.01)

(52) U.S. Cl. .............................. 43/15; 43/16

(58) Field of Classification Search ............ 43/15, 16, 43/21.2
See application file for complete search history.

(56) References Cited

U.S. PATENT DOCUMENTS

| | | | |
|---|---|---|---|
| 2,986,834 A * | 6/1961 | Irwin ................................ 43/15 |
| 3,154,875 A * | 11/1964 | Biddison ........................... 43/15 |
| 3,660,921 A * | 5/1972 | McDonnell ....................... 43/15 |
| 3,890,734 A * | 6/1975 | Kawai et al. ....................... 43/4 |
| 4,031,651 A | 6/1977 | Titze |
| 4,197,668 A * | 4/1980 | McKinsey ......................... 43/15 |
| 4,344,248 A | 8/1982 | Brophy, Sr. et al. |
| 4,397,113 A | 8/1983 | Pinson |
| 4,676,018 A | 6/1987 | Kimball |
| 5,245,778 A * | 9/1993 | Gallegos et al. .................. 43/15 |
| 5,524,376 A | 6/1996 | Flisak |
| 5,542,205 A | 8/1996 | Updike |
| 6,336,287 B1 * | 1/2002 | Lobato ............................. 43/16 |
| 6,449,895 B1 * | 9/2002 | Zabihi ............................. 43/21 |
| 6,681,516 B2 | 1/2004 | Fayerman et al. |
| 6,722,078 B1 * | 4/2004 | Kelley et al. .................. 43/19.2 |
| 7,017,296 B2 | 3/2006 | Templeman et al. |
| 7,086,194 B1 | 8/2006 | Troyer, Jr. |
| 2006/0026891 A1 * | 2/2006 | Witt ................................ 43/15 |
| 2006/0070290 A1 * | 4/2006 | Toy ................................. 43/15 |

* cited by examiner

*Primary Examiner* — Christopher P Ellis
(74) *Attorney, Agent, or Firm* — Theodore J. Bielen, Jr.

(57) ABSTRACT

A fishhook setting apparatus utilizing a lever arm support which holds a fishing rod associated with the fishhook and which is freely rotatable about a pre-determined arcuate path. The trigger mechanism initiates the instantaneous raising of the rod chip through the lever arm support when the lever arm support travels to the extreme portion of an arcuate path.

11 Claims, 4 Drawing Sheets

FISHING APPARATUS

BACKGROUND OF THE INVENTION

The present invention relates to a novel and useful fishing apparatus.

Fishing often requires a great deal of patience and skill. This is especially true when a fisherman presents a lure or bait to fish which are located beneath the surface of the water. In many cases, certain fish will initially take a baited hook, but will reject the same once the hook itself or resistance to the pulling of the baited hook is detected. At this point, an experienced fisherman would quickly set the hook in order to catch the fish. Where a fishing rod and reel, having a baited hook is set in a stand or is not other wise closely attended, the fish is often lost because the initial strike by the fish takes place before the fisherman is able to set the hook.

In the past, many devices have been proposed to automatically trigger the setting of a hook by quickly raising the tip of the rod when a fish initially bites the baited hook. For example, U.S. Pat. Nos. 6,681,516 and 7,086,194 disclose fishing rod holders which latch a fishing rod to a holder and signals a fish strike by the use of a spring mechanism when the fish pulls on a hook connected to the fishing rod through a line.

U.S. Pat. Nos. 4,031,651 4,397,113, and 5,542,205 disclose hook setting devices in which a fishing rod and reel are fixed to a holder that is coupled to a trigger mechanism that lifts the rod tip once a fish strikes the fishing apparatus.

U.S. Pat. No. 5,542,205 shows a fishhook setting device in which the rod and real are placed in a tube and a trigger is engaged when a pawl moves away from a roller via a link arm. Upward movement is afforded by the use of a spring mechanism.

U.S. Pat. Nos. 4,676,018, 5,245,778, and 5,524,376 show spring actuated rod lifters to set fishing hooks in which the fishing line aids in triggering the device when a fish strikes the hook. A spring mechanism is used to rapidly lift the tip of the rod to set the hook.

U.S. Pat. Nos. 4,397,113 and 7,017,296 show hook setting devices for fishing where a spring lifts the rod tip upwardly when the fish strikes the hook connected the line of the fishing pole. The spring action is initiated by a trigger which reacts to the pulling force exerted by the fish striking the hook.

A hook setting device for a fishing apparatus which quickly reacts to the striking action of the fish and accommodates the motion of a boat or the adjacent body of water would be a notable advance in the sporting arts.

BRIEF SUMMARY OF THE INVENTION

In accordance with the present invention a novel and useful hook setting mechanism for a fishing apparatus is herein provided.

The apparatus of the present invention utilizes a base and a fastener which holds the base to a platform. The platform may consist of a fixed surface or be a portion of a water craft.

A lever arm support is employed in the present invention and includes a first arm, a second arm, and a fulcrum. The lever arm support is rotatably attached at its fulcrum to the base. In addition, the lever arm support includes a surface having a mount for confining fishing rod thereto. The lever arm is freely rotatable about the fulcrum within a pre-determined arcuate path to accommodate the motion of the boat or the motion of the body of water in which the fishing apparatus is being used.

A lifter is also employed in the present invention for instantaneously raising and rotating, about the lever arm fulcrum, the first arm of the lever arm support and the tip of the fishing rod. Such trigger may take the form of a pneumatic device or an electrical device. In the latter case, a motor and relay maybe employed with at least one ON switch and one OFF switch. In either case, the lifter maybe easily reset by deactivating the lifter.

A trigger employed with the pneumatic version of the present invention and may include a valve having a actuator which links the valve to a source of compressed air. Compressed air is then fed to a pneumatic cylinder which interacts with the lever arm to allow the lifter to instantaneously rotate the lever arm support. Such trigger may take place by direct contact between the lever arm support and a portion of the valve trigger. Likewise, an intermediate device maybe employed which is capable of contacting the lever arm support and the actuator found at the valve.

In the case of the electrical version of the present invention, such trigger may take the form of a pair of switches, one switch initiating the lifter in its instantaneous rotation of the lever arm support, and another switch stopping the rotation of the lever arm support. Such switches may be activated by a cam surface connected to the fulcrum of the lever arm support.

It may be apparent that a novel and useful fish hook setting apparatus has been hereinabove described.

It is therefore an object of the present invention to provide a fishhook setting apparatus which reliably and quickly sets the hook associated with a fishing rod and reel when a fish exerts pressure on the hook.

Another object of the present invention is to provide a fishhook setting apparatus in which the apparatus maybe mounted on a moving surface or on a fixed surface and accommodates the movement of a body of water or a boat.

Another object of the present invention is to provide a fishhook setting apparatus which employs a source of compressed air or electrical energy to actuate the same.

Yet another object of the present invention is to provide a fishhook setting apparatus which is capable of catching fish that strikes gently on a baited hook or lure connected to a fishing pole.

The invention possesses other objects and advantages as especially as concerns particular characteristics and features thereof which will become apparent as the specification continues.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior delineated drawings.

Figure 1:
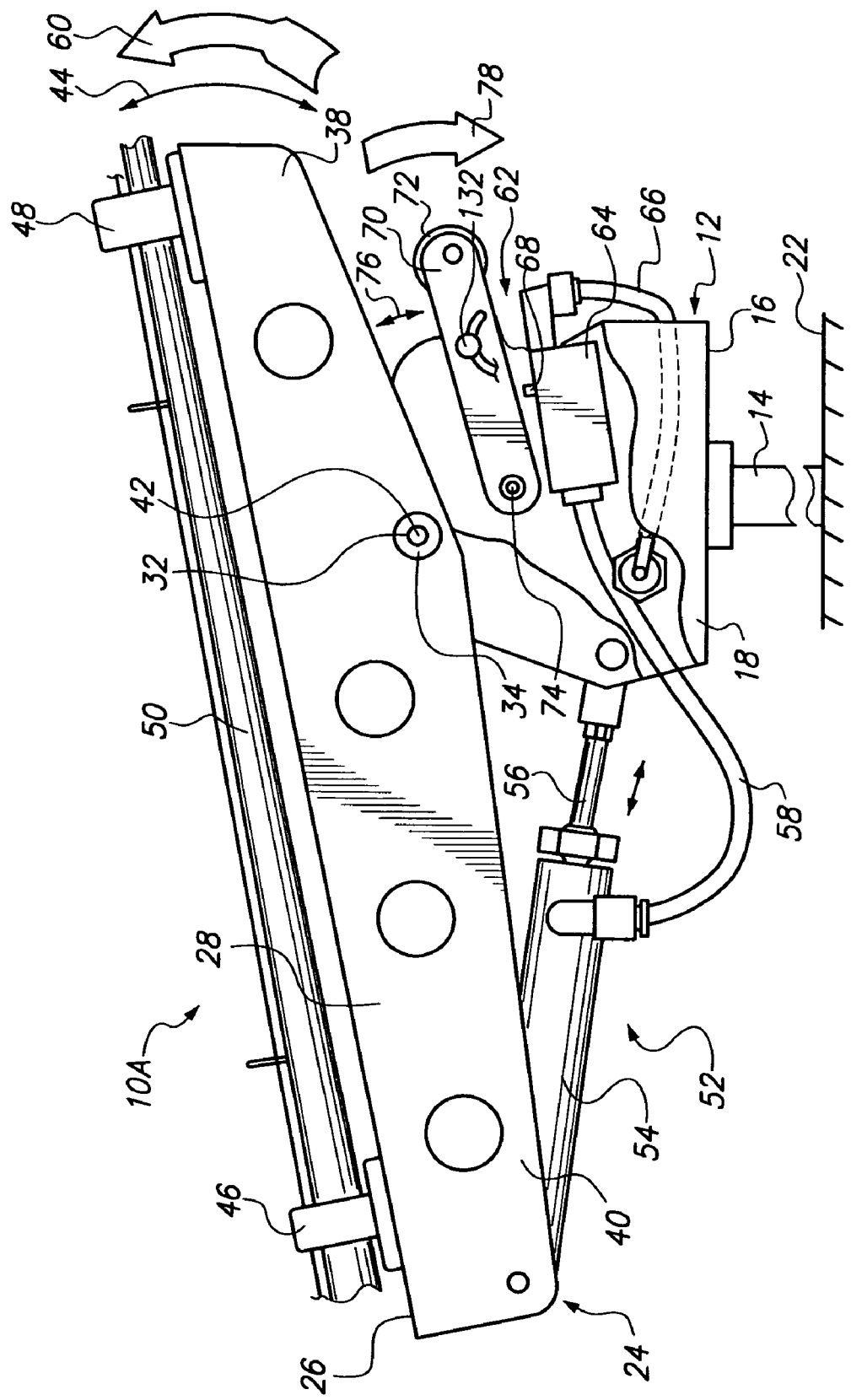
FIG. 1 is a side elevational view of the first, pneumatic, embodiment of the fishhook setting apparatus of the present invention.

Each embodiment of the present invention is depicted in the drawings by reference character 10 followed by an upper case letter. With reference to FIG. 1, it may be observed that apparatus 10A is shown in detail. Apparatus 10A includes as one of its elements a base 12 having a post 14 which may fit into a suitable support on a dock, a vessel, shoreline, and the like. Base 12 may be formed into a generally U-shaped member having a bottom 16 and two upright plates 18 and 20. Base 12 and post 14 maybe constructed of any suitable rigid or semi-rigid material. Post 14 serves as a holder for base 18 with respect to platform 22 which, as heretofore described, maybe the deck of a boat, the rail on a pier, the ground surface adjacent a body of water and the like.

Apparatus 10A is also provided with a lever arm support 24. Lever arm support 24 may also be formed into a u-shaped member having a top surface 26 and depending side portions 28 and 30, FIGS. 1 and 2. Lever arm support 24 is rotatable attached to base 12 at fulcrum 32 via fasteners 34 and 36. In general, fulcrum 32 separates lever arm support into first arm 38 and second arm 40 which rotate about axis 42. It should be noted that such rotational movement of lever arm support 24 is free and travels along an arcuate path indicated by directional arrow 44 on FIG. 1. In addition, surface 26 of lever arm support 24 is fitted with mounts or clips 46 and 48 to confine fishing rod 50, having a rod tip (not shown) that is oriented toward first arm 38. Needless to say, fishing rod 50 is also associated with the necessary fishing appurtenances such as a reel, a line, a hook, and the like.

Referring again to FIGS. 1 and 2, it maybe apparent that apparatus 10A includes a lifter 52 for instantaneously raising and rotating first arm 38 of lever arm support 24 about fulcrum 32. Lifter 52, in embodiment 10A, includes a pneumatic cylinder 54 having a bar 56 that is linked to base 12. Prior to activation of lifter 52, bar 56 serves as a general damping and limiting member for the rocking travel of lever arm support 24 about its arcuate path, directional arrow 44. Needless to say, lever arm support 24 will follow arcuate path 44 due to the rocking of a boat, the movement of the body of water being fished, and the like. Pneumatic cylinder 54 is employed with a source of compressed air (not shown) which travels to pneumatic cylinder 54 via conduit 58. Directional arrow 60, FIG. 1, represents the instantaneous rotation of first arm 38 due to the rapid action of pneumatic cylinder 54.

A trigger 62 is also employed in apparatus 10A of the present invention. Trigger 62 includes a three-way valve 64 which receives compressed air from the source of compressed air via conduit 66. Trigger 62 is activated by interaction between lever arm support 24, specifically first arm 38 thereof, with actuator 68. Such interaction between lever arm support 24 and actuator 68 takes place via a leg 70 having a contact 72 at its end portion. Leg 70 rotates about axis 74 according to directional arrow 76. Thus, the downward movement of first arm 38, directional arrow 78, FIG. 1, causes the touching by first arm 38 of contact 72, which in turn allows leg 70 to depress actuator 68 of valve 64. It should be noted that the downward movement indicated by directional arrow 78 is usually due to a fish taking the bait on a hook, or a lure, associated with fishing rod 50. Such downward movement 78 goes generally exceeds the normal arcuate path indicated by directional arrow 44.

Figure 3:
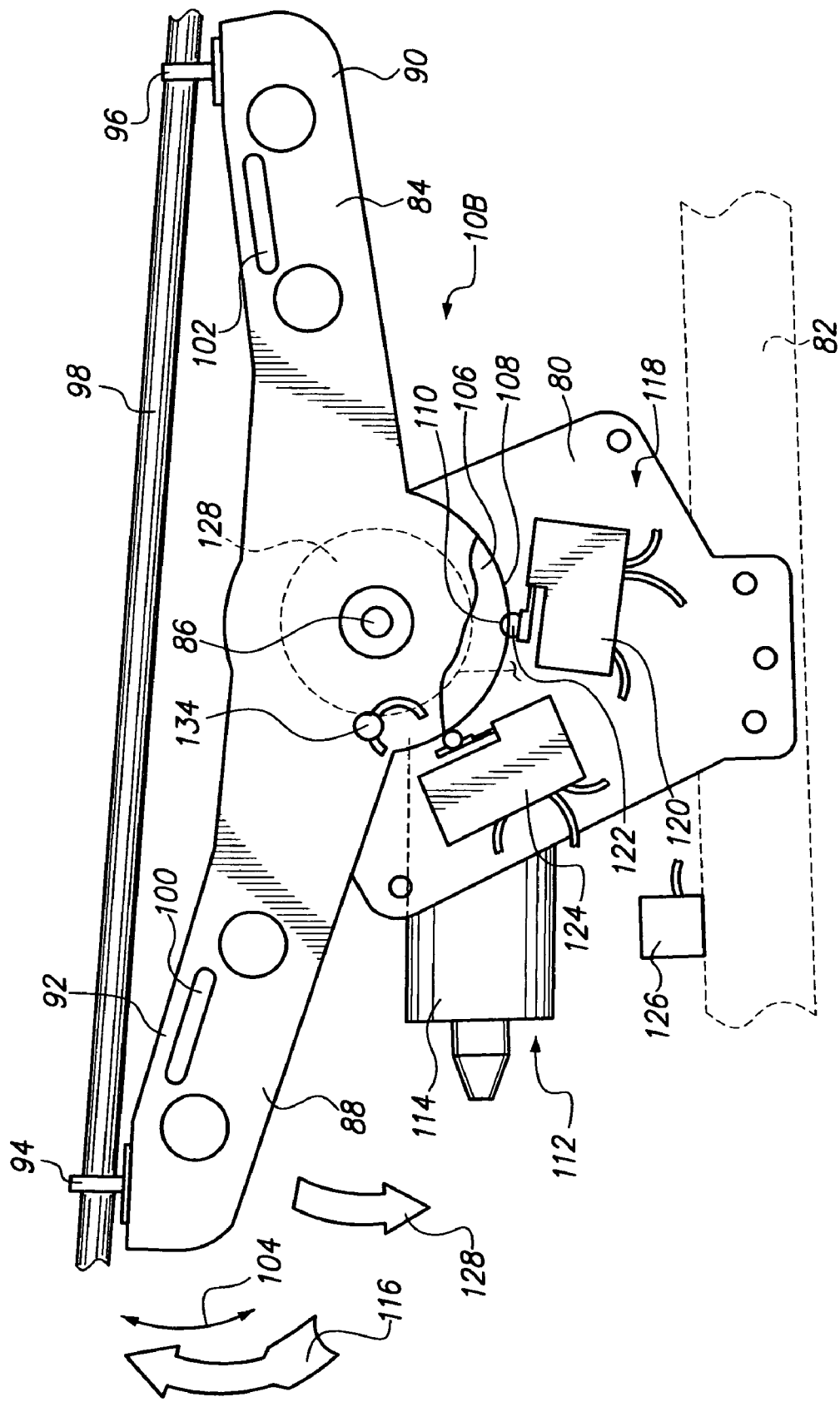
FIG. 3 is a side elevational view of another electrical embodiment of the apparatus of the present invention.

Turning now to FIG. 3, it may be observed that another embodiment 10B of the present apparatus is depicted. Apparatus 10B includes a base 80 in the form of a plate which fastens or is held to platform 82. Again, platform 82 may be similar to platform 22 described with respect to apparatus 10A. Lever arm support 84 rotates about fulcrum 86 and defines a first arm 88 and a second arm 90 thereof. Upper surface 92 of lever arm support 84, supports clips 94 and 96, which in turn, hold fishing rod 98 in place. Slots 100 and 102 maybe employed for straps or other similar items to hold fishing rod 98 in place. Again, lever arm support 84 is capable of traveling along an arcuate path defined by directional arrow 104. Lever arm support 84 is also includes a disc 106 which circumvents fulcrum 86. Disc 106 includes an outer surface 108 having a recess 110.

Lifter 112 takes the form of an electric motor 114 which is connected to a source of power and may employ a gear box 128 to transfer motion from motor 114 to fulcrum 86. Again, lifter 84 is capable of rotating lever support arm 84 about fulcrum 86 such that first arm 88 instantaneously raises according to directional arrow 116. Needless to say, the tip (not shown) of rod 98 extends outwardly laterally beyond first arm 88 of lever arm 84.

Trigger 118 takes the form of a normally open limit switch 120 having a actuator wheel 122 which rides along surface 108 of disc 106. Entry of wheel 122 into recess 110 of disc 106 activates limit switch 120 causing lifter 112 to rotate first arm 88 about fulcrum 86 of lever support arm 84. It should be noted that recess 110 will migrate clockwise, in FIG. 3, until normally closed second limit switch 124 is opened. Limit switch 124 includes an actuator structure similar to limit switch 120, in this regard.

Limit switch 124 serves to stop the rotation of first arm 88 of lever arm support 84 in its upward motion. Relay 126 interacts with limit switches 120, and 124 in this regard. Again, the strike of a fish on the hook associated with fishing rod 98 initially lowers first arm 88 sufficiently to allow limit switch 20 to activate lifter 112. Such downward motion initiated by a fish strike is indicated by directional arrow 128, FIG. 3.

Figure 4:
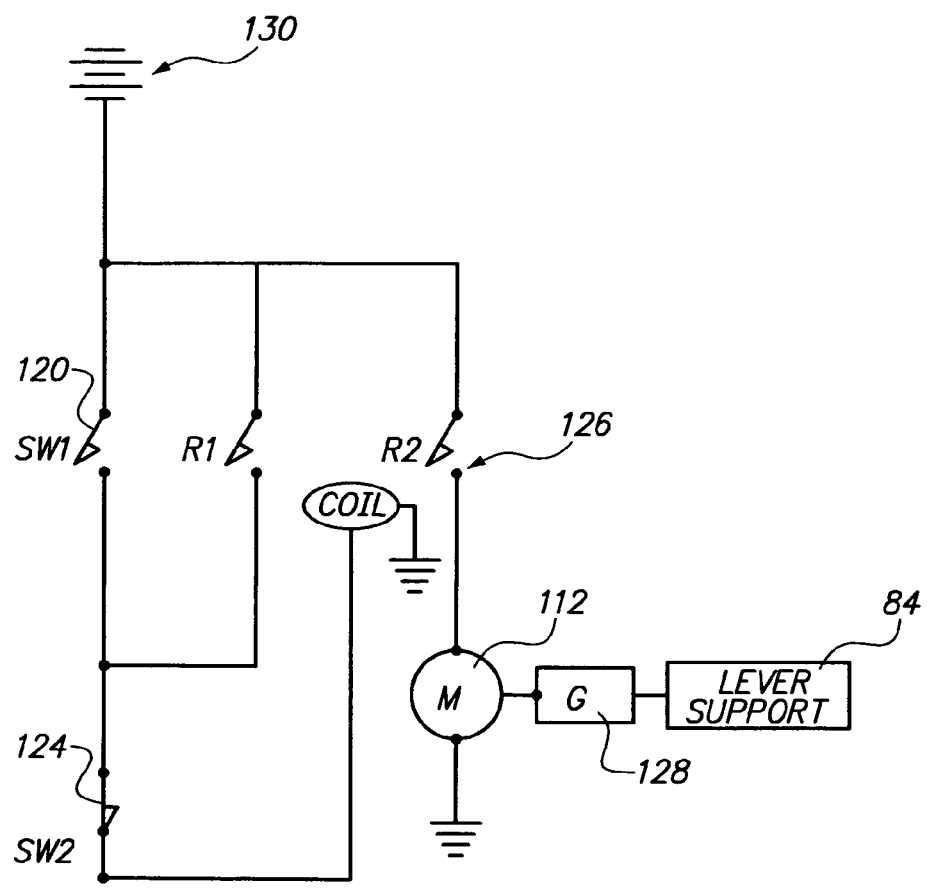
FIG. 4 is an electrical schematic depicting the triggering mechanism of the embodiment depicted in FIG. 3.

FIG. 4 represents an electrical schematic illustrating the operation of apparatus 10B in which lifter motor 112 is associate with a gear box 128 to rotate lever support 84 about fulcrum 86. Limit switches 120 and 124 interact with relay 126 to affect the initiation and stopping of the rotational lever support 84 as shown. Source of power 130 maybe a battery, a generator, and the like. In any case, source of power 130 necessarily operates motor 112 through the schematic rendition depicted in FIG. 4 of apparatus 10B.

Figure 2:
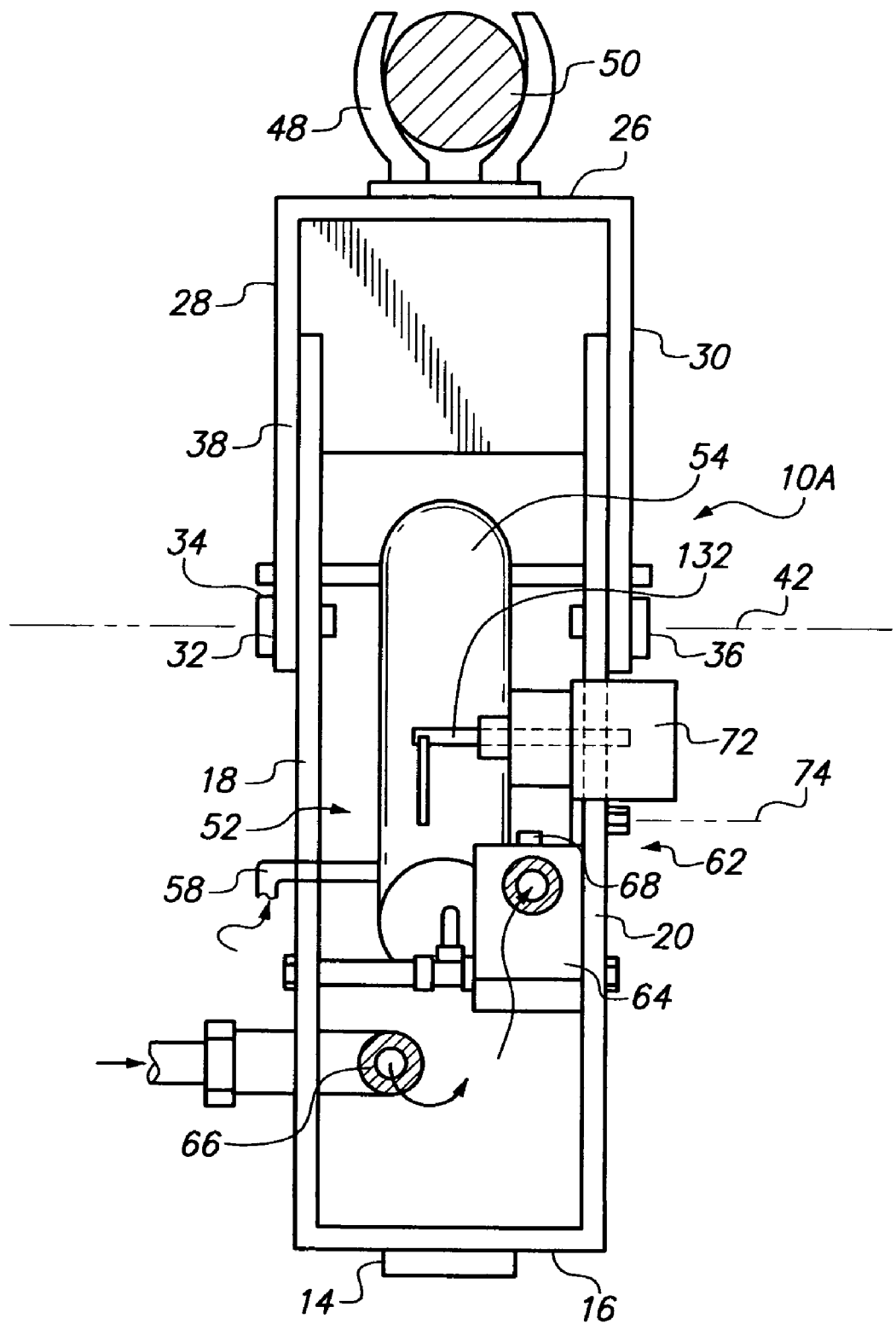
FIG. 2 is a right side elevational view of the apparatus depicted in FIG. 1.

In operation, the apparatus 10A, FIGS. 1 and 2 is mounted on a platform 22 via holder 14 connected to base 12. Lever arm support 24 is free to follow an arcuate path 44 around fulcrum 32 and, thus, accommodates the rocking of a boat, the wave motion, the body of water, a current, and the like. Upon the striking of a fish on the hook associated with rod 50, directional arrow 78, trigger 62 is activated specifically by the touching between first arm 38, contact 72, and leg 62 upon actuator 68 of three-way valve 64. At this point, compressed air from a source passes through conduit 66 and conduit 58 to lifter 52, in the form of pneumatic cylinder 54. Pneumatic cylinder 54 then expands instantaneously lifting first arm 38 upwardly, directional arrow 60 to set the hook into a striking fish. Pin 132 will then be pulled to release the same from base 12 to allow resetting of the apparatus shown in FIGS. 1 and 2. That is to say, valve 64 is inactivated as soon as leg 70 separates from actuator 68. With respect to the embodiment of 10B of FIGS. 3 and 4, lever arm support arm 84 is free to rotate about fulcrum 86 until actuator wheel 122 of limit switch 120 enters recess 110 of disc 106. At this point, lifter 112, in the form of motor 114, via gear box 128 instantaneously raises first arm 84 of lever support arm, directional arrow 116 to set the hook in a striking fish. Limit switch 124 will deactivate motor 114 when recess 110 interacts with limit switch 124. Pin 134 will hold lever support arm 84 in the upward position and removal of pin 134 from an opening in base 80 (not shown) will then free up lever support arm 84 to allow it to again follow its free arcuate path, directional arrow 104, until another fish strikes the hook associated with rod 98.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A fishing apparatus utilized with a platform and a fishing rod having tip comprising:
    a. a base,
    b. a holder positioning said base to the platform
    c. a lever arm support, said lever support arm including a first arm, a second arm, and a fulcrum, said lever arm support being rotatably attached at said fulcrum to said base, said lever arm support further including a surface and a mount for confining the fishing rod to said surface; said lever arm support being freely rotatable about said fulcrum within a predetermined arcuate path;
    d. a lifter for instantaneously raising and rotating, about said fulcrum, said first arm of said lever arm support and the tip of the fishing rod;
    e. a trigger initiating said instantaneous raising and rotating about said fulcrum of said first arm of said lever arm support about said fulcrum, said trigger being activated by interaction with said lever arm support and at least a portion of said trigger at an end portion of said predetermined arcuate path, and
    f. source of compressed air, and said lifter comprising a pneumatic cylinder spaced between said base and said lever arm support, said trigger comprising a valve having an actuator, said valve linking the source of compressed air to said pneumatic cylinder upon contact of said actuator with said valve, said actuator being positioned to interact with said lever arm support upon rotation thereof along said predetermined arcuate path.

2. The apparatus of claim 1 in which said mount comprises a clip.

3. The apparatus of claim 1 in which additionally comprises a leg rotatably attached to said base, said leg lying intermediate said lever arm support and said portion of said trigger.

4. The apparatus of claim 1 which additionally comprises a stop for halting the instantaneous raising and rotating, about said fulcrum, of said first arm of said lever arm support.

5. A fishing apparatus utilized with a platform and a fishing rod having tip comprising:
    a. a base,
    b. a holder positioning said base to the platform
    c. a lever arm support, said lever support arm including a first arm, a second arm, and a fulcrum, said lever arm support being rotatably attached at said fulcrum to said base, said lever arm support further including a surface and a mount for confining the fishing rod to said surface; said lever arm support being freely rotatable about said fulcrum within a predetermined arcuate path;
    d. a lifter for instantaneously raising and rotating, about said fulcrum, said first arm of said lever arm support and the tip of the fishing rod;
    e. a trigger initiating said instantaneous raising and rotating about said fulcrum of said first arm of said lever arm support about said fulcrum, said trigger being activated by interaction with said lever arm support and at least a portion of said trigger at an end portion of said predetermined arcuate path, and
    f. a source of electrical energy and in which said lifter comprises an electric motor linked to said lever arm support, said trigger comprising one electrical switch having an actuator, said actuator of said one electrical switch being positioned to interact with said lever arm support upon rotation thereof along said predetermined arcuate path, and actuating said one electrical switch to divert said source of electrical energy to said electric motor, thereby.

6. The apparatus of claim 5 which further comprises at lest one electric relay located intermediate said one electrical switch and said electric motor.

7. The apparatus of claim 5 which additionally comprises a stop for halting the instantaneous raising and rotating, about said fulcrum, of said first arm of said lever arm support.

8. The apparatus of claim 7 in which said stop comprises another electrical switch, said another electrical switch having an actuator, said actuator of said another electrical switch being positioned to interact with said lever arm support upon rotation thereof along said predetermined arcuate path.

9. The apparatus of claim 5 which additionally comprises a gear, said gear activated by said electric motor and interacting with said lever arm support to rotate said lever arm support along a predetermined arcuate path.

10. The apparatus of claim 5 in which said mount comprises a clip.

11. The apparatus of claim 5 in which additionally comprises a leg rotatably attached to said base, said leg lying intermediate said lever arm support and said portion of said trigger.

* * * * *